US012526874B2

(12) United States Patent
Li et al.

(10) Patent No.: US 12,526,874 B2
(45) Date of Patent: Jan. 13, 2026

(54) SIDELINK TRANSMISSIONS ENABLED BY RECEIVER USER-EQUIPMENT (UE)

(71) Applicant: QUALCOMM Incorporated, San Diego, CA (US)

(72) Inventors: Qing Li, Princeton Junction, NJ (US); Peng Cheng, Beijing (CN); Ozcan Ozturk, San Diego, CA (US); Gavin Bernard Horn, La Jolla, CA (US); Hong Cheng, Basking Ridge, NJ (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 18/041,721

(22) PCT Filed: Oct. 22, 2020

(86) PCT No.: PCT/CN2020/122690
§ 371 (c)(1),
(2) Date: Feb. 15, 2023

(87) PCT Pub. No.: WO2022/082562
PCT Pub. Date: Apr. 28, 2022

(65) Prior Publication Data
US 2023/0300752 A1 Sep. 21, 2023

(51) Int. Cl.
*H04W 76/27* (2018.01)
*H04W 52/02* (2009.01)
(Continued)

(52) U.S. Cl.
CPC ....... *H04W 76/27* (2018.02); *H04W 52/0235* (2013.01); *H04W 76/28* (2018.02); *H04W 92/18* (2013.01)

(58) Field of Classification Search
CPC . H04W 52/0235; H04W 76/28; H04W 92/18; H04W 72/20; H04W 76/14; H04W 4/40; H04W 76/27; Y02D 30/70
See application file for complete search history.

(56) References Cited

U.S. PATENT DOCUMENTS 11,234,184 B1 * 1/2022 Lee ................. H04W 72/30
2015/0029866 A1 * 1/2015 Liao ................. H04W 48/14
370/254

(Continued)

FOREIGN PATENT DOCUMENTS

CN     106817745 A    6/2017
CN     110393039 A   10/2019

(Continued)

OTHER PUBLICATIONS

International Search Report and Written Opinion—PCT/CN2020/122690—ISA/EPO—Jul. 13, 2021.

(Continued)

*Primary Examiner* — Michael K Phillips
(74) *Attorney, Agent, or Firm* — Patterson & Sheridan, L.L.P.

(57) ABSTRACT

Certain aspects provide a method for wireless communication by a first user-equipment (UE). The method may include: determining whether data is to be received from one or more second UE's; transmitting at least one enable signal indicating to the one or more second UE's to transition to an active mode of operation to transmit the data; and monitoring for the data in response to the at least one enable signal during a reception phase of the UE.

30 Claims, 15 Drawing Sheets

(51) Int. Cl.
*H04W 76/28* (2018.01)
*H04W 92/18* (2009.01)

(56) References Cited

U.S. PATENT DOCUMENTS

| | | | |
|---|---|---|---|
| 2019/0215897 A1 | 7/2019 | Babaei et al. | |
| 2020/0008261 A1 | 1/2020 | Islam et al. | |
| 2020/0037247 A1 | 1/2020 | Liao et al. | |
| 2020/0053647 A1 | 2/2020 | Chae et al. | |
| 2020/0322770 A1 | 10/2020 | Lepp et al. | |
| 2020/0382966 A1* | 12/2020 | Hanson | H04B 7/15528 |
| 2021/0297842 A1* | 9/2021 | Shrivastava | H04W 28/24 |
| 2022/0322202 A1* | 10/2022 | Li | H04M 15/93 |
| 2022/0353815 A1* | 11/2022 | Lin | H04W 76/28 |
| 2023/0071186 A1* | 3/2023 | Lu | H04W 48/08 |
| 2023/0199712 A1* | 6/2023 | Lu | H04W 76/14 455/458 |
| 2023/0239793 A1* | 7/2023 | Lin | H04W 52/028 370/311 |
| 2023/0292098 A1* | 9/2023 | Ganesan | H04W 84/047 |
| 2024/0015796 A1* | 1/2024 | Fehrenbach | H04W 8/24 |
| 2024/0098815 A1* | 3/2024 | Freda | H04W 76/23 |
| 2024/0259906 A1* | 8/2024 | Freda | H04W 40/22 |

FOREIGN PATENT DOCUMENTS

| | | |
|---|---|---|
| CN | 111556590 A | 8/2020 |
| WO | 2018064477 A1 | 4/2018 |
| WO | 2019063001 A1 | 4/2019 |
| WO | 2020101953 A1 | 5/2020 |

OTHER PUBLICATIONS

Supplementary European Search Report—EP20958145—Search Authority—Munich—Jun. 18, 2024.

* cited by examiner

SIDELINK TRANSMISSIONS ENABLED BY RECEIVER USER-EQUIPMENT (UE)

CROSS-REFERENCE TO RELATED APPLICATIONS

This application is a national stage application under 35 U.S.C. 371 of PCT/CN2020/122690 filed Oct. 22, 2020, which is hereby expressly incorporated by reference herein in its entirety as if fully set forth below and for all applicable purposes.

INTRODUCTION

Aspects of the present disclosure relate to wireless communications, and more particularly, to techniques for sidelink communication.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved sidelink communication.

Certain aspects provide a method for wireless communication by a first user-equipment (UE). The method may include: determining whether data is to be received from one or more second UE's for at least one application or service with at least one sidelink communications; transmitting at least one enable signal indicating to the one or more second UE's to transition to an active mode of operation to transmit the data; and monitoring for the data in response to the at least one enable signal during a reception phase of the UE for the at least one application or service with the at least one sidelink communications.

Certain aspects provide a method for wireless communication by a first UE. The method may include: receiving, from a second UE, an enable signal indicating to the first UE to transition to an active mode of operation to transmit data for at least one application or service with at least one sidelink communications; determining whether data is to be transmitted to the second UE during a transmit phase based on the enable signal; and transmitting the data to the second UE during the transmit phase based on the determination for the at least one application or service with the at least one sidelink communication.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for sidelink (SL) transmission enabling. For example, certain aspects provide techniques for a receiver (Rx) UE to manage sidelink transmissions for power saving. For instance, an Rx UE may transmit one or more enable signals (also referred to as transmission enable (TxEn) indications) to one or more transmitter (Tx) UEs, requesting that the one or more Tx UEs transmit data to the Rx UE. In some implementations, the Rx UE may transmit TxEn signals periodically (e.g., during respective DRX on phases), or aperiodically, as described in more detail herein.

The following description provides examples of configurations for sidelink (SL) communication in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
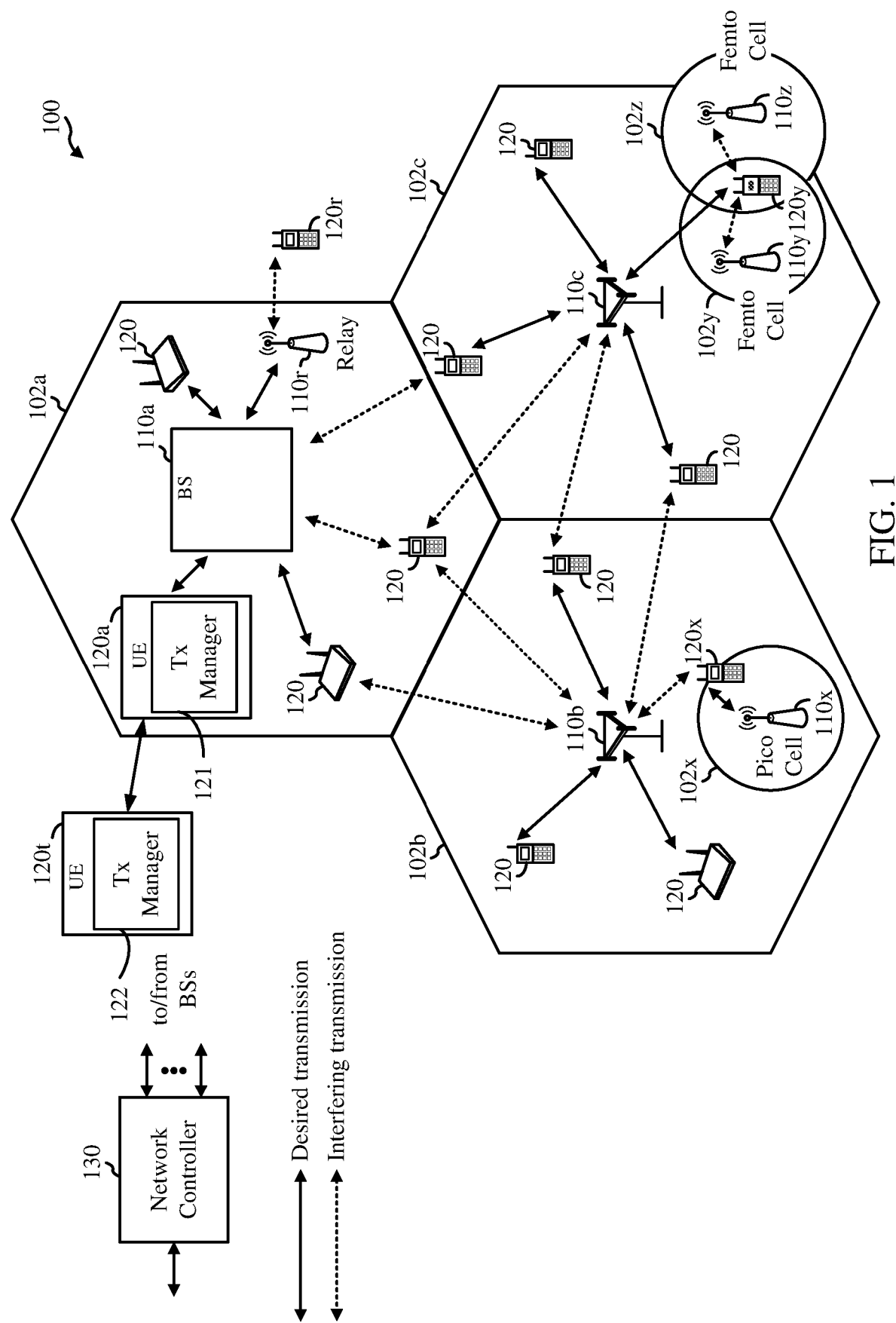
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

According to certain aspects, the UEs 120 may be configured for managing sidelink in a discontinuous reception (DRX) mode of operations. As shown in FIG. 1, the UE 120*a* includes a transmission manager 121. The UE 120*a* may be a Rx UE in some cases. In this case, the transmission manager 121 may be configured for: determining whether data is to be received from one or more second UEs for at least one application or service with at least one sidelink communications; transmitting at least one enable signal indicating to the one or more second UE's to transition to an active mode of operation to transmit the data; and monitoring for the data in response to the at least one enable signal during a reception phase of the UE for the at least one application or service with the at least one sidelink communications. In some cases, the UE 120*t* may include a transmission manager 122. The UE 120*t* may be a Tx UE. The transmission manager 122 may be configured for: receiving, from a second UE, an enable signal indicating to the first UE to transition to an active mode of operation to transmit data for at least one application or service with at least one sidelink communications; determining whether data is to be transmitted to the second UE during a transmit phase based on the enable signal; and transmitting the data to the second UE during the transmit phase based on the determination for the at least one application or service with the at least one sidelink communication.

Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
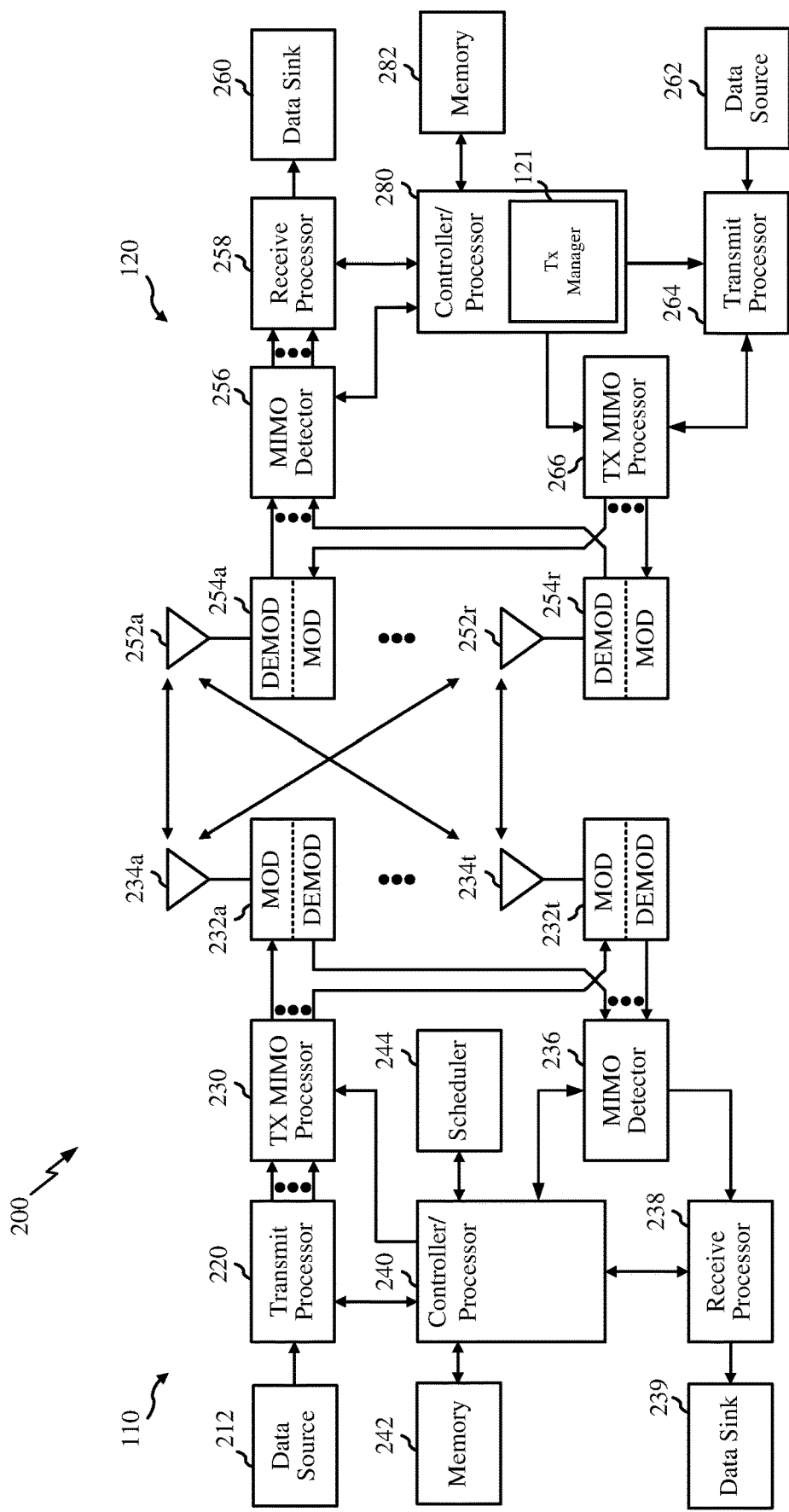
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

The controller/processor 280 and/or other processors and modules at the UE 120*a* may perform or direct the execution of processes for the techniques described herein. As shown in FIG. 2, the controller/processor 280 of the UE 120 has the transmission manager 121 (or transmission manager 122). Although shown at the Controller/Processor, other components of the UE 120*a* may be used performing the operations described herein.

Figure 3B:
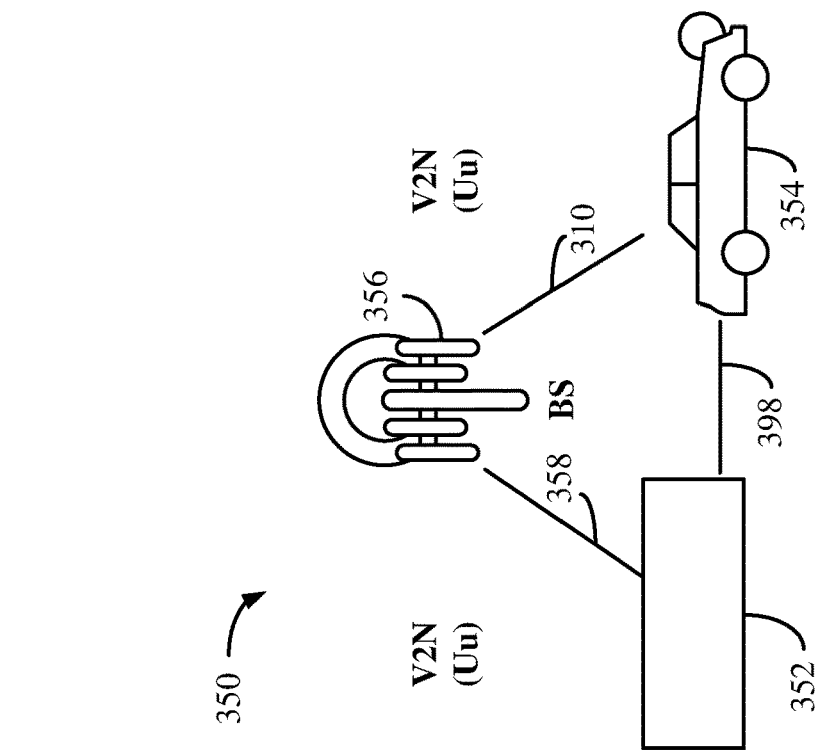
FIGS. 3A and 3B show diagrammatic representations of example vehicle to everything (V2X) systems in accordance with some aspects of the present disclosure.
Figure 3A:
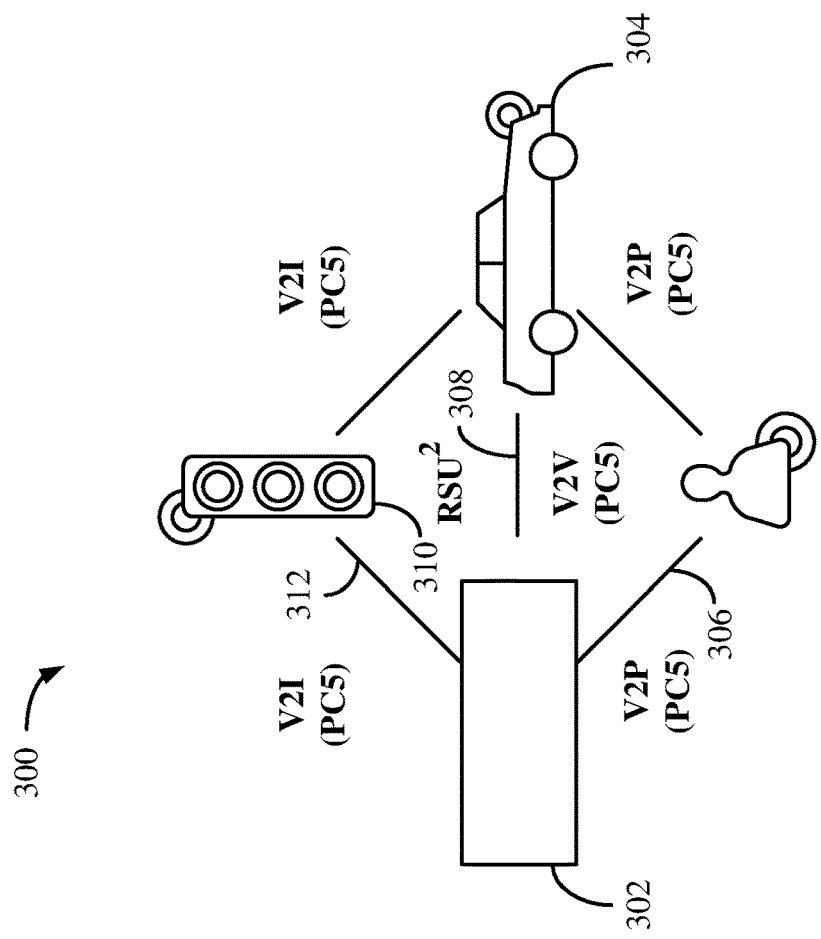

FIGS. 3A and 3B show diagrammatic representations of example vehicle to everything (V2X) systems in accordance with some aspects of the present disclosure. For example, the UEs shown in FIGS. 3A and 3B may communicate via sidelink channels and may perform sidelink CSI reporting as described herein.

The V2X systems, provided in FIGS. 3A and 3B provide two complementary transmission modes. A first transmission mode, shown by way of example in FIG. 3A, involves direct communications (for example, also referred to as side link communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE). As illustrated, UEs 352, 354 may communicate with each other using a sidelink (SL) 398.

Referring to FIG. 3A, a V2X system 300 (for example, including vehicle to vehicle (V2V) communications) is illustrated with two UEs 302, 304 (e.g., vehicles). The first transmission mode allows for direct communication between different participants in a given geographic location. As illustrated, a vehicle can have a wireless communication link 306 with an individual (V2P) (for example, via a UE) through a PC5 interface. Communications between the UEs 302 and 304 may also occur through a PC5 interface 308. In a like manner, communication may occur from a UE 302 to other highway components (for example, highway component 310), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X system 350 for communication between a UE 352 (e.g., vehicle) and a UE 354 (e.g., vehicle) through a network entity 356. These network communications may occur through discrete nodes, such as a base station (for example, an eNB or gNB), that sends and receives information to and from (for example, relays information between) UEs 352, 354. The network communications through vehicle to network (V2N) links (e.g., Uu links 358 and 310) may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as acknowledgement (ACK) or negative acknowledgement (NACK) for hybrid automatic repeat request HARQ feedback or channel state information (CSI) related to a sidelink channel quality.

Discontinuous Reception (DRX) on Sidelink

In a discontinuous reception (DRX) mode of operation, a UE may enter a low power ("sleep") mode (also referred to herein as a "sleep phase"), which may also be referred to as a low power state, for a certain period of time (referred to as a DRX OFF phase, or duration) and wakes up again during a DRX on (e.g., awake phase) duration (also referred to as a DRX on phase) to check if there is any data to be received. The cycle of sleep and wake up (DRX on and DRX off) durations repeats over time, allowing the UE to save power while maintaining communication.

Currently, DRX is not defined for sidelink operations, and thus, a receiver (Rx) UE has to monitor for sidelink control information (SCI) for each time slot, causing high power consumption which is especially detrimental for battery power confined UEs such as pedestrian UEs for Vehicle-to-Person (V2P) service on sidelink or UEs for public safety services on sidelink. Thus, SL DRX design is needed to save power for sidelink communications. As compared with communications between a UE and a base station (B S) on the Uu interface, sidelink communications among different UEs are more diverse. For example, a UE may simultaneously engage in different vehicle-to-everything (V2X) services with different quality of service (QoS) requirements (e.g., reliability, latency, etc.), and different communication types (e.g., broadcast, groupcast and unicast). Therefore, a one-size-fits-all SL DRX design may not be best for both saving power and meeting diverse QoS requirements.

Figure 4:
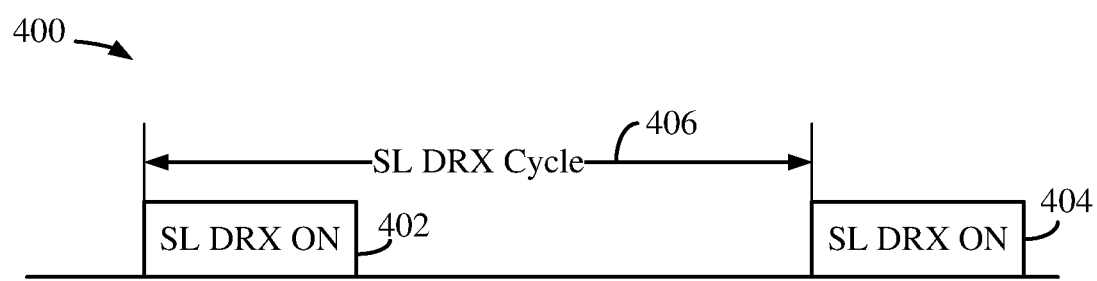
FIG. 4 illustrates an example sidelink discontinuous reception (SL DRX) configuration of a UE, in some aspects.

FIG. 4 illustrates an example SL DRX configuration 400 of a UE. As illustrated, the SL DRX configuration 400 may include SL DRX on phases 402, 404. As described herein, an SL DRX on phase repeats every DRX cycle. For example, the DRX on phase 402 is during a DRX cycle 406, as illustrated. A receiver (Rx) UE of unicast or Rx UEs of broadcast or groupcast are awake during the DRX on phases 402, 404 to communicate with one or more Tx UE for unicast broadcast or groupcast, (e.g., Rx UE(s) monitors for signaling that may be received from the Tx UE(s)), and Rx UE(s) are in a low power state (e.g., sleep phase) at other times (also referred to as SL DRX sleep phase) during which Tx UE(s) may communicate to other Rx UE(s) of another service, group or UE pair or Tx UE(s) may also be in a low power state. In addition, a UE of a service, a group, or a UE pair, becomes a Tx UE on sidelink when it has a packet to transmit on sidelink to the other UEs of a service or a group or to the other UE of a UE pair. Hence, differently from the DRX for a UE monitoring downlink control information (DCI) from a base station at Uu interface, SL DRX is bidirectional on sidelink for both Tx UE and Rx UE(s) of a service, a group or a UE pair and therefore an SL DRX forms sidelink traffic patterns for a service, a group or a UE pair.

Example SL DRX Operations

As described herein, sidelink discontinuous reception (SL DRX) may be formed to assist a Rx UE for unicast, broadcast or groupcast in determining when to monitor for sidelink control information(s) (SCI(s)) from a Tx UE, the SCI scheduling a sidelink transmission to the Rx UE(s). Thus, SL DRX allows the Rx UE(s) to save power by non-contiguously monitoring SCI. As described herein, an SL DRX is bidirectional and also forms the traffic pattern for a Tx UE. In other words, a Tx UE may not transmit while Rx UE(s) is not in an SL DRX on state for monitoring SCI(s). In other words, if the Rx UE(s) is not in a DRX on phase, the Rx UE may be in a sleep mode of operation and may not monitor for SCIs. Thus, a Tx UE may also forgo transmissions to other UEs that are not in a DRX on phase.

If different SL DRXs are formed for different communications types, a UE participating in different sidelink communication types may wake up to monitor SCI for each sidelink DRX on phase based on one or multiple DL DRX configurations or based on one or multiple wake up indications (also referred to herein as wake up signals) prior to an SL DRX on phase. These communication types may include a communication among all UEs with an application or service using broadcast, a communication among UEs within a group using groupcast, and/or a communication between a UE pair using unicast. Therefore, an Rx UE may monitor SCI(s) from one or multiple Tx UEs for one or multiple communications of an application or service, a group, or a UE pair for each sidelink DRX on phase based on one or multiple DL DRX configurations or based on one or multiple wake up indications prior to an SL DRX on phase. This may cause high power consumption at the Rx UE because the Rx UE has to wake up frequently to monitor different scheduling SCIs from different Tx UEs for different communications. Certain aspects of the present disclosure are directed to an Rx UE managed sidelink DRX communication protocol.

There are various use cases where an Rx UE may manage the sidelink traffic for more power saving (e.g., resulting in less frequent wake ups) and better performance. In this manner, the Rx UE may avoid half duplex or hidden node issues which may affect sidelink performance. One use case may involve a UE being triggered to wake up for collecting sensor sharing data from all other UEs in proximity, e.g., when the UE is about to make a moving trajectory change. Another use case may involve a pedestrian UE being triggered to wake up for safety messages from all other UEs in proximity, e.g., when the UE about to cross the street. Another use case may include a roadside unit (RSU) sending a data pulling request, e.g., for assisted sensing or positioning measurements from other UEs. Another use case may include a group lead or cluster lead calling for reports from the UEs within the group or cluster. For these example use cases, it may be more efficient for power saving if an Rx UE can enable (e.g. manage) the sidelink traffic, e.g., initiate a sidelink transmission. Furthermore, it may be beneficial to overall performance if an Rx UE can also assist the resource selection for the enabled sidelink transmission, e.g., providing possible resources or measurements.

Certain aspects of the present disclosure provide techniques for an Rx UE to enable a sidelink transmission to reduce power consumption and improve performance. For example, certain aspects provide apparatus and method for an Rx UE to enable a sidelink transmission to, for example, pull for data from at least one Tx UE for a sidelink communication. Certain aspects also provide various design details for transmission of an enabling indication in order for an Rx UE to enable one or more sidelink transmissions. For instance, a UE may participate in one or more sidelink communications with the same or different UEs. In this case, it may be more efficient for power saving if an Rx UE can enable and disable the sidelink traffic, e.g., send a transmission enabling indication to Tx UE(s) either periodically (e.g., as configured) or aperiodically (e.g., event triggered), as described in more detail herein.

Figure 5:
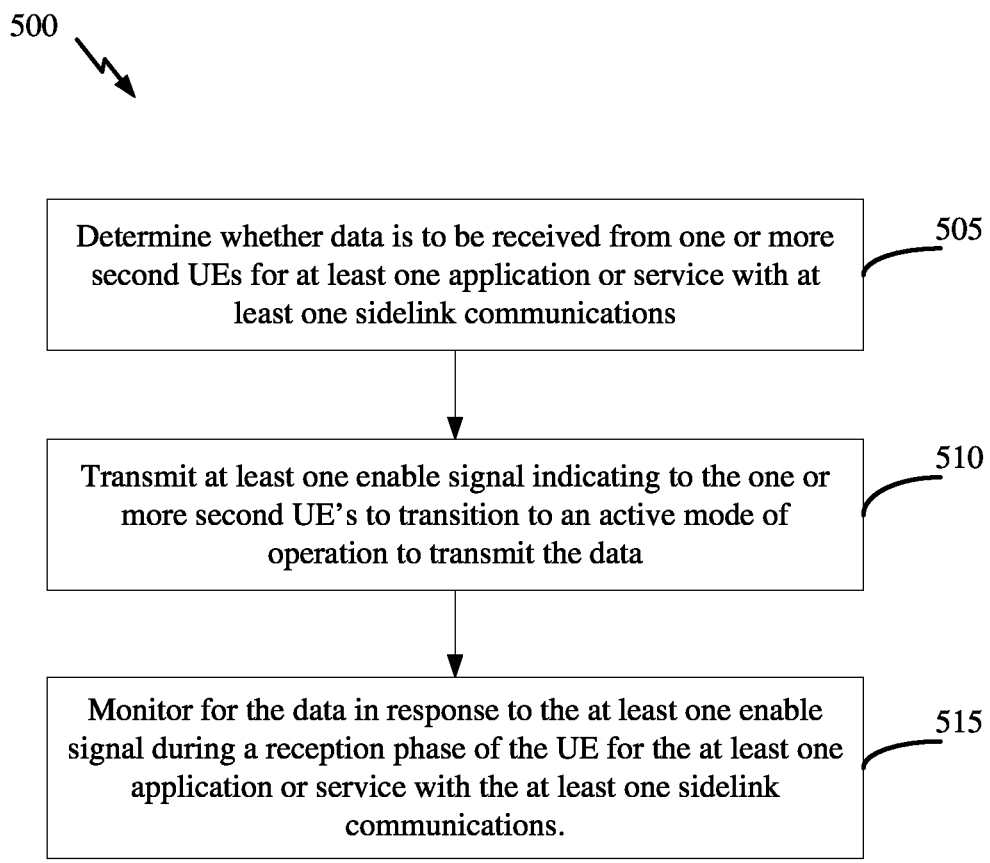
FIG. 5 is a flow diagram illustrating example operations for wireless communication, in accordance with certain aspects of the present disclosure.

FIG. 5 is a flow diagram illustrating example operations 500 for wireless communication, in accordance with certain aspects of the present disclosure. The operations 500 may be performed, for example, by a first UE (e.g., such as a UE 120a in the wireless communication network 100, or a UE 120t out of the wireless communication network 100), such as a Rx UE. A Rx UE generally refers to a UE receiving during a DRX on phase.

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, with the first UE (e.g., Rx UE) determining whether data is to be received from one or more second UEs (e.g., Tx UEs) for at least one application or service with at least one sidelink communications, and at block 510, transmitting at least one enable signal (e.g., also referred to herein as a transmission enabling (TxEn) indication) indicating to the one or more second UEs to transition to an active mode of operation to transmit the data. For example, the indication to transition to the active mode of operation may include an indication to activate a transmit chain for the transmission of the data from the one or more second UE's.

At block 515, the first UE may monitor for the data in response to the at least one enable signal during a reception phase of the UE. In some aspects, the first UE may activate a receive chain to monitor for the data during the reception phase of the first UE. The first UE may receive the data from the one or more second UEs during the reception phase of the first UE for the at least one application or service with the at least one sidelink communications, in some aspects.

In some aspects, the first UE may receive, during the reception phase, an indication that no data is to be transmitted by the one or more second UEs, and deactivate a receive chain of the UE in response to the indication to end the reception phase. The first UE may also transmit at least one disable signal to the one or more second UEs, the at least one disable signal indicating that the one or more second UEs can transition to an inactive state of operation, as described in more detail herein.

In some aspects, the at least one enable signal may be transmitted during a sidelink DRX on phase, the first UE may extend the sidelink DRX on phase to monitor for the other transmission. When the extended sidelink DRX on phase expires, the first UE may transmit a transmission disable signal indicating that the one or more second UEs can transition to an inactive state of operation.

Figure 6:
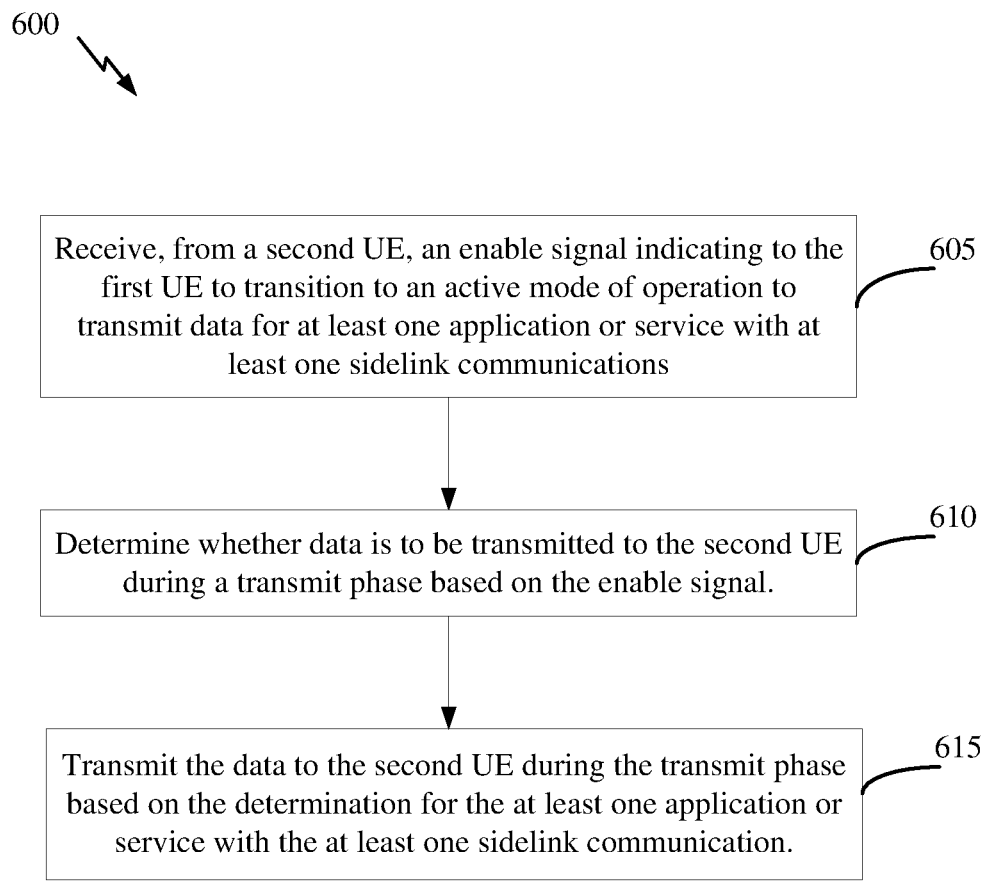
FIG. 6 is a flow diagram illustrating example operations for wireless communication, in accordance with certain aspects of the present disclosure.

FIG. 6 is a flow diagram illustrating example operations 600 for wireless communication, in accordance with certain aspects of the present disclosure. The operations 600 may be understood to be complementary to the operations 500 of FIG. 5. The operations 600 may be performed, for example, by a UE (e.g., such as a UE 120a in the wireless communication network 100, or a UE 120t out of the wireless communication network 100), such as a Tx UE. A Tx UE generally refers to a UE transmitting during a DRX on phase.

Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 605, with the first UE (e.g., Tx UE) receiving, from a second UE (e.g., Rx UE), an enable signal indicating to the first UE to transition to an active mode of operation to transmit data for at least one application or service with at least one sidelink communications. For example, the indication to transition to the active mode of operation may include an indication to activate a transmit chain for the transmission of the data.

At block 610, the first UE determines whether data is to be transmitted to the second UE during a transmit phase based on the enable signal. The first UE may activate a transmit chain to transmit the data during the transmit phase of the first UE based on the determination. At block 615, the first UE may transmit the data to the second UE during the transmit phase based on the determination for the at least one application or service with the at least one sidelink communication.

In some aspects, the first UE may transmit, during the transmit phase, an indication that no data is to be transmitted based on the determination. The first UE may then receive at least one disable signal from the second UE, the at least one disable signal indicating that the first UE can transition to an inactive state of operation.

In certain aspects, the enable signal may be transmitted during a sidelink DRX on phase. The first UE may transmit sidelink control information along with the data, the control information allocating resources for another transmission after the sidelink DRX on phase. In this case, the first UE may extend the sidelink DRX on phase (also Tx On phase) to transmit the other transmission.

Figure 7A:
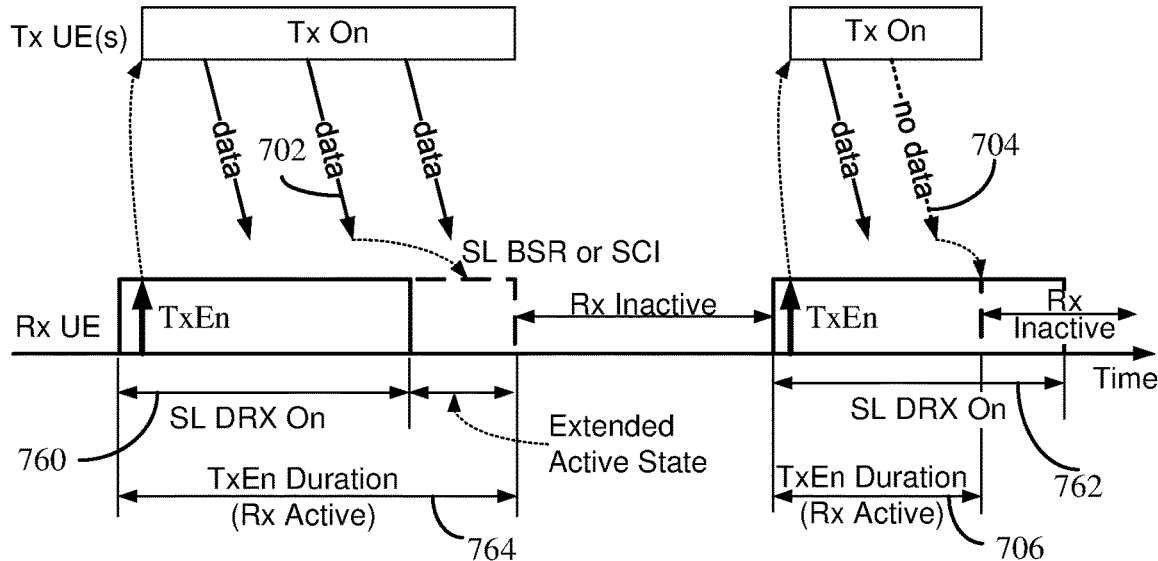
FIG. 7A illustrates a receiver (RX) UE managed sidelink DRX protocol using periodic enable signal transmission, in accordance with certain aspects of the present disclosure.

FIG. 7A illustrates an RX UE managed sidelink DRX protocol using periodic enable signal transmission, in accordance with certain aspects of the present disclosure. As illustrated, a Rx UE may send a transmission enabling (TxEn) indication periodically, e.g., with an Rx UE's SL DRX cycle. An Rx UE may wake up and enter a SL DRX on phase and send a TxEn to Tx UE(s) in order to pull data during the SL DRX on phase (e.g., SL DRX on phase 760 and 762). The Rx UE decides to stay in an Rx active mode of operation or not during the SL DRX on phase, based on Tx UEs' responses. While the Rx UE is Rx active 764 and 706, the receive chain of the UE may be on, allowing the Rx UE to monitor for SCIs. Otherwise, the Rx UE may deactivate the RX UE's receive chain to save power. The UE may determine to stay in Rx active 764 based on whether any data is pending, as indicated in Tx UE's sidelink buffer status report (SL-BSR) 702, or whether there are any reservations for transmission(s) or retransmission(s), as indicated in Tx UE's scheduling SCI 702. For example, the UE may determine that no further data transmissions are to occur during a SL DRX on phase (e.g., SL DRX on phase 762), and end the SL DRX on phase early, as illustrated. For instance, the UE may receive an indication 704 that no further data is to be transmitted or no pending data reported in SL BSR, based on which the Rx UE may end the SL DRX on phase early. In other words, the Rx active duration 706 may be less than the configured duration of the SL DRX on phase 762. In this case, the first UE may transmit a transmission disable signal indicating that the one or more second UEs can transition to an inactive state of operation before SL DRX On duration ends.

The Rx UE may decide to extend the active state or not when the SL DRX on phase ends, based on Tx UEs' responses, e.g., if any data is pending as indicated in a sidelink buffer status report (SL-BSR), or if there is any reservation for transmission(s) or retransmission(s) as indicated in a scheduling SCI. For example, if SCI transmitted with data 702 allocates resources for a retransmission after the SL DRX on phase 760, the SL DRX on phase 760 may be extended with SL DRX Inactivity timer in order for the Rx UE to monitor for the retransmission, as illustrated. In other words, the TxEn duration 764 (e.g. Rx active duration) may be longer than a duration of the SL DRX on phase 760. In this case, when only one second UE scenario, the first UE and second UE may transition to an inactive state of operation when the SL DRX On Duration timer expires (i.e. ending of SL DRX On duration without extension) or when the SL DRX Inactivity timer expires (i.e. ending the extension of SL DRX on phase); when more second UEs, the first UE may transmit a transmission disable signal indicating that the one or more second UEs can transition to an inactive state of operation.

Figure 7B:
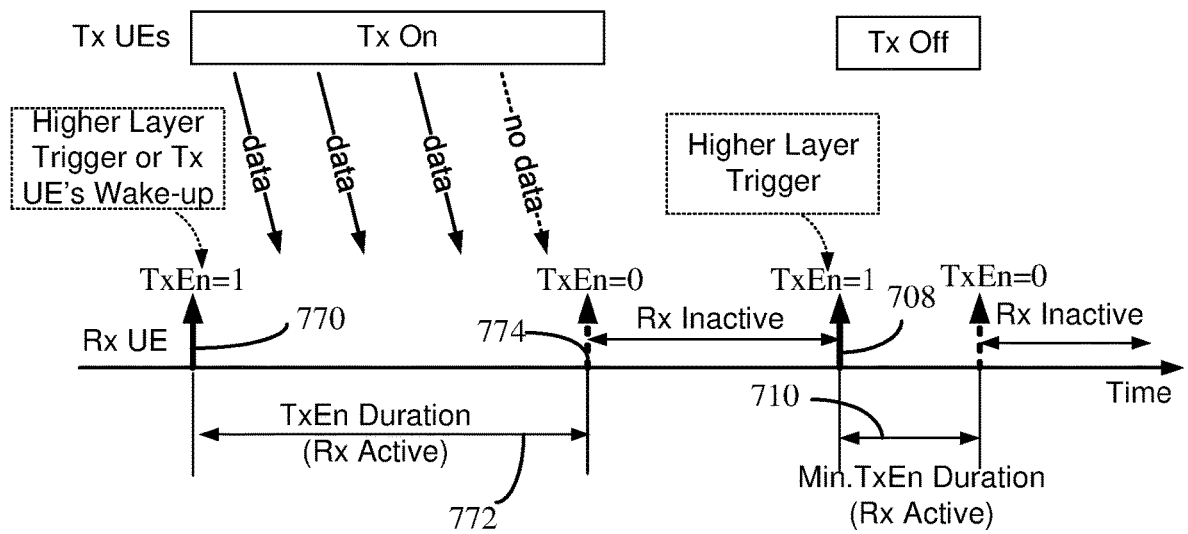
FIG. 7B illustrates an RX UE managed sidelink DRX protocol using aperiodic enable signal transmission, in accordance with certain aspects of the present disclosure.

FIG. 7B illustrates an RX UE managed sidelink DRX protocol using aperiodic enable signal transmissions, in accordance with certain aspects of the present disclosure. For example, a TxEn indication 770 may be triggered by a higher layer (the higher layer is, herein till further description, application layer, V2X service layer, or access stratum (AS) layer) of the UE or by detection of wake up indication from a Tx UE. That is, an Rx UE may receive a trigger from its higher layer (e.g., application layer) for pulling data or detect a wake up indication from a Tx UE with data available, and then send a "TxEn=1" to enable other Tx UEs to transmit data. The Rx UE decides to stay active (e.g., "TxEn=1") or not ("TxEn=0") based on Tx UEs' responses, e.g., if any data is pending as indicated in a Tx UE's sidelink buffer status report (SL-BSR), or if any reservation for transmission(s) or retransmission(s) as indicated in a Tx UE's scheduling SCI. The Rx UE optionally ends the TxEn duration 772 (active window, also referred to as a transmission enable window) with another TxEn 774 ("TxEn=0") based on Tx UEs' responses, e.g., no data pending as indicated in its sidelink buffer status report (SL-BSR), or no reservation for transmission(s) or retransmission(s) as indicated in its scheduling SCI. The Rx UE may stay active for a minimum TxEn duration if configured, in case there is no Tx UE's response. For example, after transmission of TxEn indication 708, no Tx UEs may have data to send to the Rx UE, as illustrated. Nevertheless, the Rx UE may stay active for a configured minimum TxEn duration 710 during which the Rx UE may monitor for SCIs.

Figure 8A:
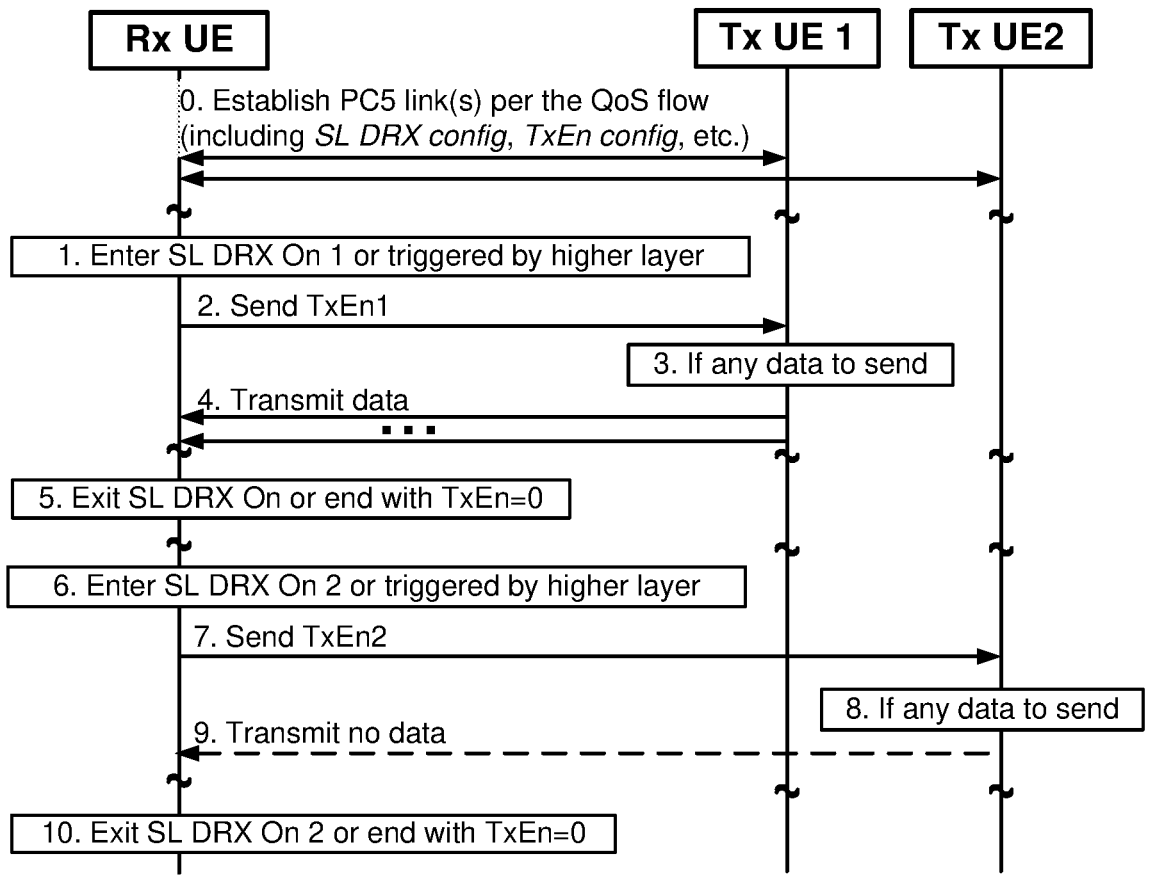
FIGS. 8A and 8B illustrate an RX UE managed sidelink DRX protocol for unicast communication(s), in accordance with certain aspects of the present disclosure.
Figure 8B:
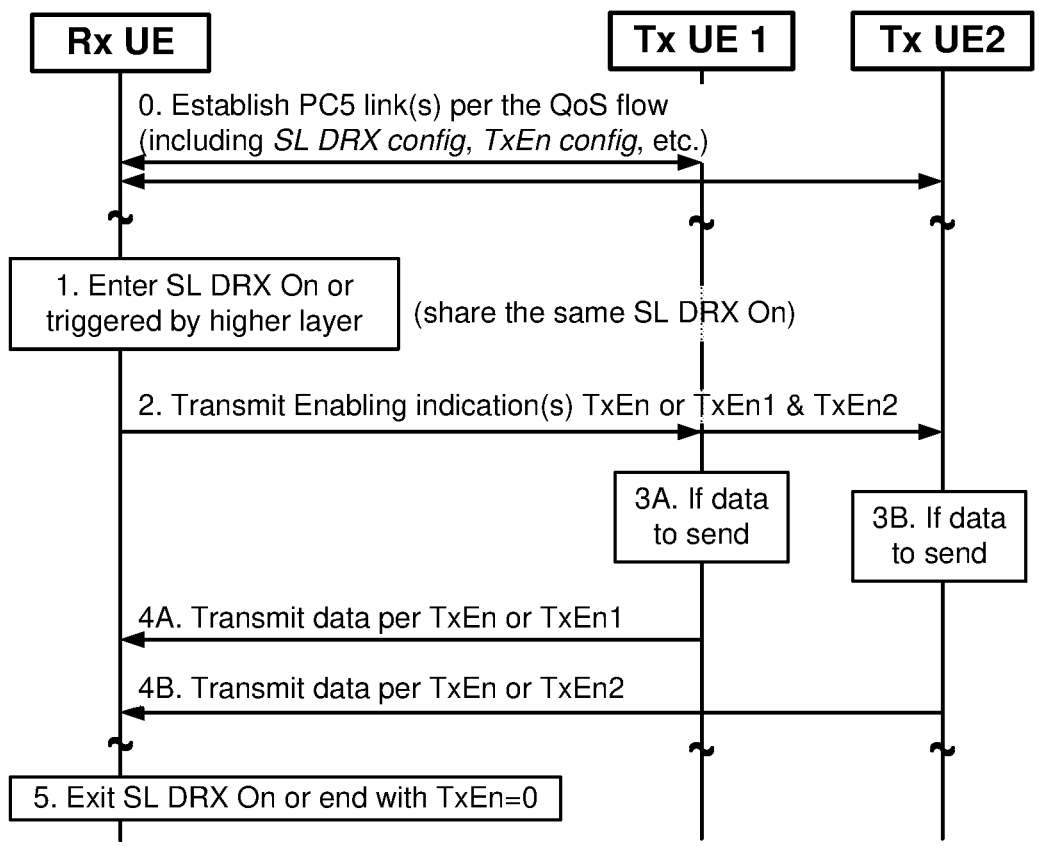

FIGS. 8A and 8B illustrate an RX UE managed sidelink DRX protocol for unicast communication(s), in accordance with certain aspects of the present disclosure. A UE may participate in one or more unicast communications with the same or different UEs. In this case, the UE may send one TxEn indication to a paired UE, as illustrated in FIG. 8A or one or multiple TxEn indications to multiple paired UEs, as illustrated in FIG. 8B.

As illustrates in FIG. 8A, at step 0, a first UE (e.g., Rx UE) establishes a first PC5 radio resource control (RRC) link with a second UE (e.g., Tx UE1) and a second PC5 RRC link with a third UE (e.g., Tx UE 2) for two unicasts respectively, which includes setting up sidelink DRX configuration if available, transmission enabling configuration, etc. At step 1, the first UE (e.g., Rx UE) enters sidelink DRX on phase if configured or is triggered by a higher layer for pulling data, and decides to send TxEn indication to Tx UE 1. At step 2, the first UE (e.g., Rx UE1) sends TxEn1 to Tx UE1. At step 3, the second UE (e.g., Tx UE1) decides if there is any data available to send. If no data is available, Tx UE1 stays in an inactive state. Otherwise, TX UE1 may transmit data. For example, as illustrated in step 4, the second UE (e.g., Tx UE1) sends data according to the TxEn indication. Tx UE1 may keep transmitting till the TxEn duration ends, as described herein. At step 5, the first UE (e.g., Rx UE1) exits the SL DRX on phase or ends TxEn duration (e.g., TxEn phase) based on Tx UE1's response.

As illustrated, the Rx UE may enter another SL DRX on phase (e.g., SL DRX on 2), which may be triggered by a higher layer, as described. At step 7, the Rx UE may transmit a second TxEn indication (e.g., TxEn2) to Tx UE2, as illustrated. At step 8, Tx UE2 determines whether there is any data to send. For example, if Tx UE2 has no data send, no data may be sent at step 9, as illustrated. At step 10, the first UE (e.g., Rx UE1) exits the SL DRX on phase or ends TxEn duration based on Tx UE2's response.

As illustrated in FIG. 8B, at step 0, a first UE (e.g., Rx UE) establishes a first PC5 RRC link with a second UE (e.g., Tx UE1) and a second PC5 RRC link with a third UE (e.g., Tx UE 2) for two unicasts respectively, which includes setting up sidelink DRX configuration if available, transmission enabling configuration, etc, as described. At step 1, the first UE (e.g., Rx UE) enters sidelink DRX on duration if configured or is triggered by a higher layer for pulling data, and decides to send TxEn indication to its UE pairs. At step 2, the first UE (e.g., Rx UE1) sends one TxEn to each of its UE pairs respectively (e.g., TxEn1 to Tx UE1 and TxEn2 to Tx UE2) or sends one TxEn to all its UE pairs (e.g., a TxEn to both Tx UE1 and Tx UE2). At steps 3A and 3B, the second UE (e.g., Tx UE1) or the third UE (e.g., Tx UE2) decides if there is any data available to send. If there is no data, the Tx UE stays inactive. At steps 4A and 4B, the second UE (e.g., Tx UE1) or the third UE (e.g., Tx UE2) sends data according to the TxEn indication. The Tx UEs may keep transmitting till the TxEn duration ends. At step 5, the first UE (e.g., Rx UE1) exits the SL DRX on duration or ends TxEn duration based on Tx UEs' response.

Figure 9A:
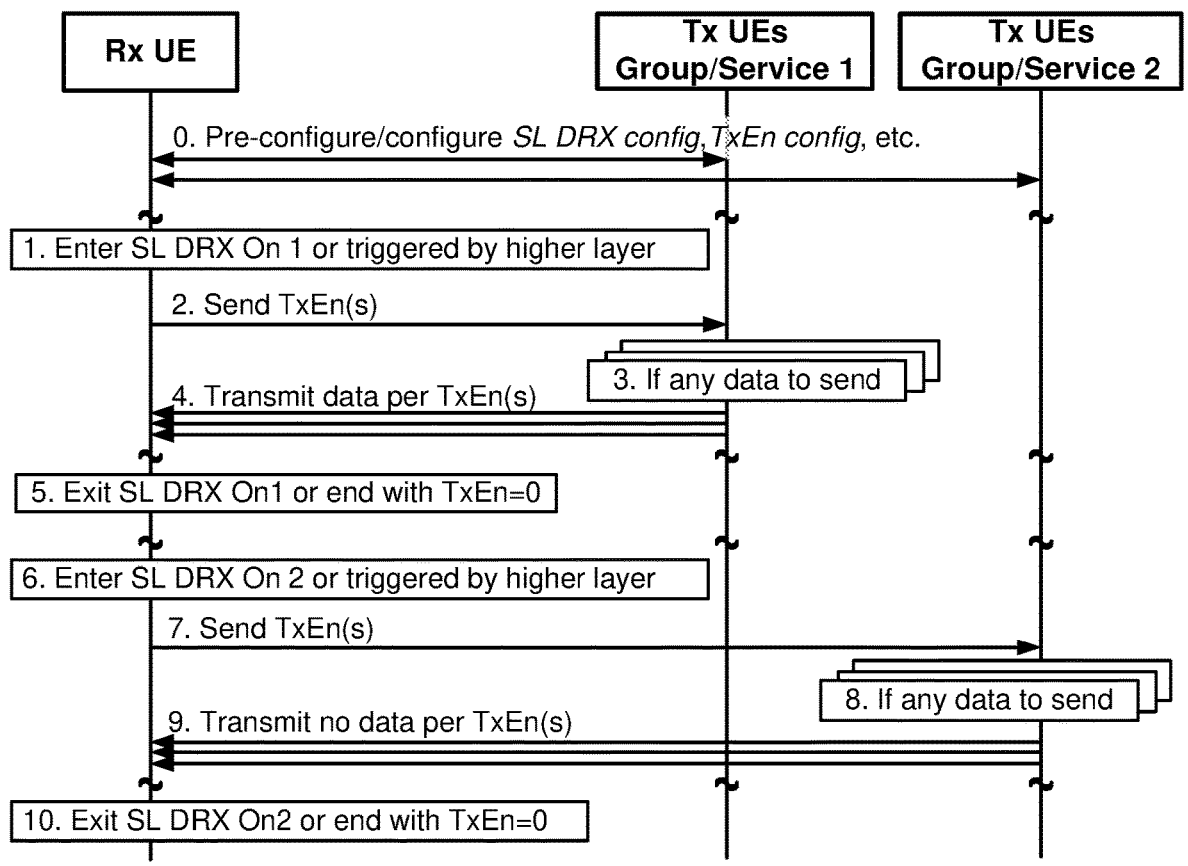
FIGS. 9A and 9B illustrate an RX UE managed sidelink DRX protocol for groupcast or broadcast communication(s), in accordance with certain aspects of the present disclosure.
Figure 9B:
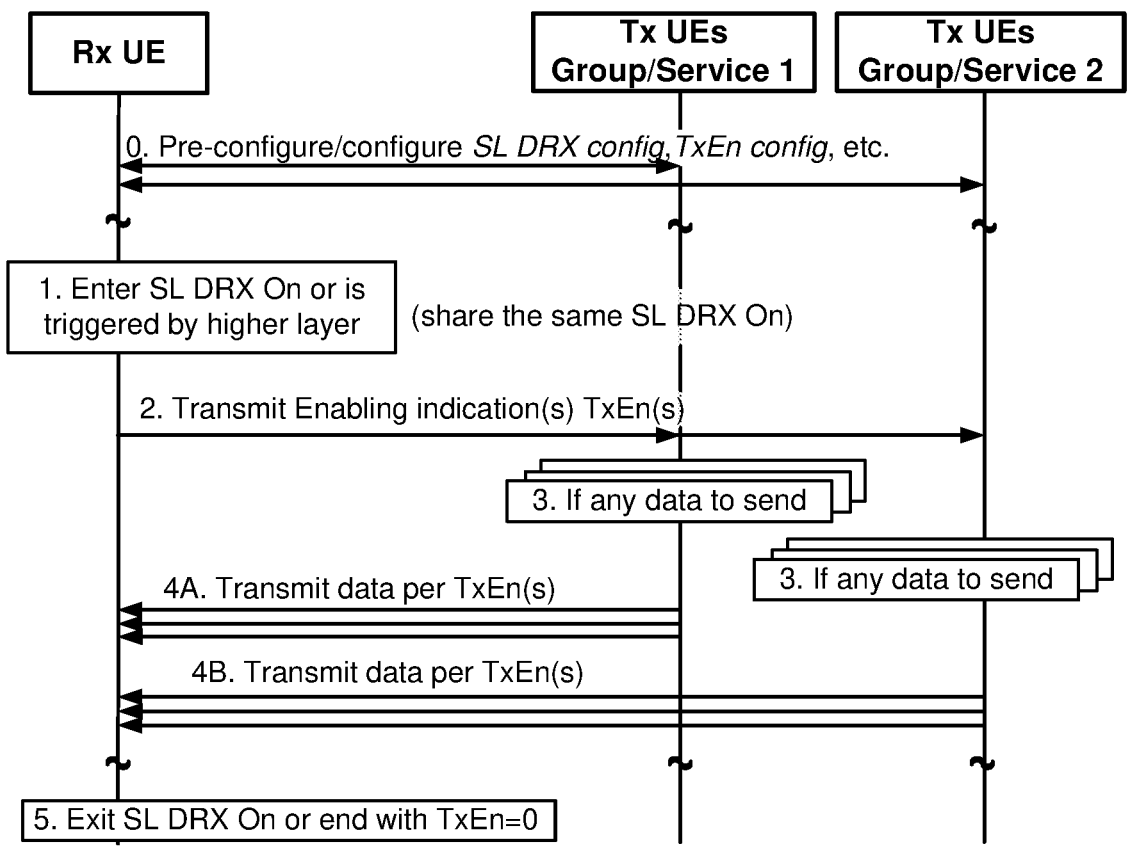

FIGS. 9A and 9B illustrate an RX UE managed sidelink DRX protocol for groupcast (e.g., group 1 or 2) or broadcast (e.g., service 1 or 2) communication(s), in accordance with certain aspects of the present disclosure. A UE may participate in one or more groupcasts or broadcasts (e.g., services) with the same UE or different UEs. In this case, the Rx UE may send a TxEn indication(s) to each group or service, as illustrated in FIG. 9A, or one or multiple TxEn indications to multiple groups or services, as illustrated in FIG. 9B. For instance, at step 2, TxEn indication(s) may be sent to Tx UEs for group 1 or service 1, during the first SL DRX on phase (e.g., SL DRX On1). Each of the Tx UEs for group 1 or service 1 may determine whether there is any data to send at step 3, and one or more of the Tx UEs for group 1 or service 1 may transmit data at step 4, as illustrated. During the second DRX on phase (e.g., SL DRX On2), TxEn indication(s) may be sent to Tx UEs for group 2 or service 2, at step 7. Each of the Tx UEs for group 2 or service 2 may determine whether there is any data to send at step 8. At step 9, the Tx UEs for group 2 or service 2 may not transmit data at step 9 if the Tx UEs do not have any data to send.

As illustrated in FIG. 9B, TxEn indication(s) may be sent to both the Tx UEs for group 1 or service 1 and Tx UEs for group 2 or service 2, during the same SL DRX on phase. Each of the Tx UEs for groups 1 or services 1 and group 2 or service 2 may determine whether there is any data to send at step 3, and transmit data in turn at steps 4A and 4B, as illustrated.

Figure 10:
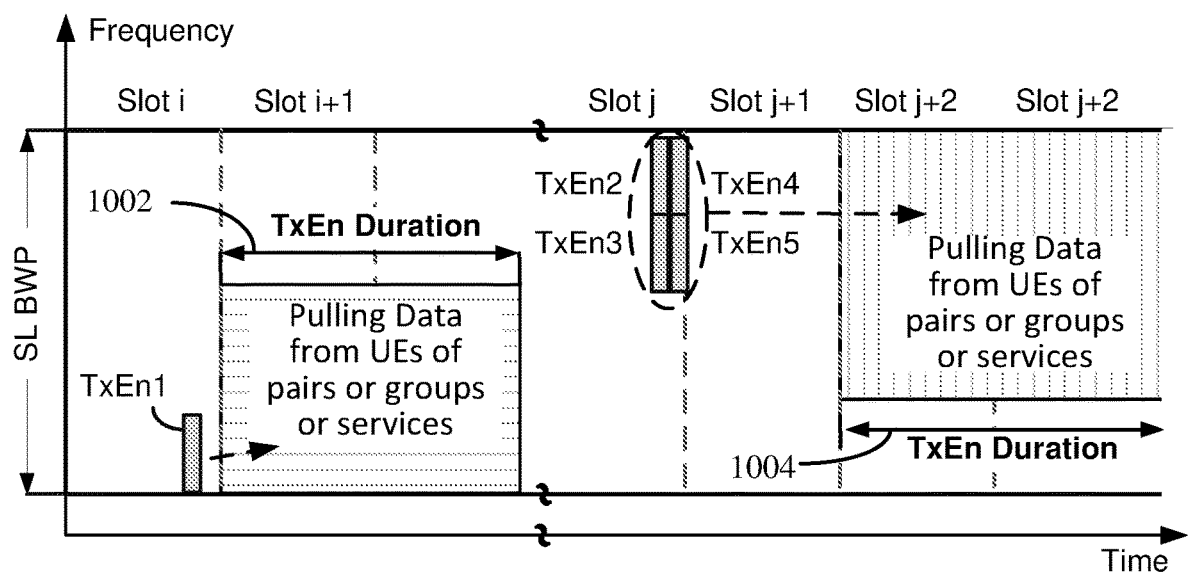
FIG. 10 illustrates transmission of transmission enable (TxEn) indications using a sequence-based approach, in accordance with certain aspects of the present disclosure.

FIG. 10 illustrates transmission of TxEn indications using a sequence-based design, in accordance with certain aspects of the present disclosure. As illustrated, a Rx UE may send the same or different sequence based TxEn indications to different Tx UEs. That is, the TxEn indication may be a sequence-based (e.g., Zadoff-Chu (ZC) sequence) signaling (e.g., 1 bit sequence with TxEn=1 for enabling transmissions and TxEn=0 (also referred to as a disable signal) for disabling transmissions) at the physical layer and transmitted at the last few symbols of a slot (e.g., TxEn1 as illustrated in FIG. 10). The TxEn indication may contain an identification of the Rx UE and the Tx UE (e.g., Rx UE's identifier (ID) or source ID, Tx UE's ID or destination ID of a UE pair, a group or a service, etc.) within the initial value or cyclic shift of the sequence. All Tx UEs may monitor the TxEn indication at the monitoring occasions per a TxEn configuration and decide to wake up for transmitting data or not based on whether any data is available in their buffers during the time interval (e.g., transmission enabling duration) that a Rx UE is pulling for data either triggered by the higher layer or a Tx UE's wake-up indication or in an SL DRX on phase. For example, TxEn1 may pull data from UEs of a pair using unicast, UEs of a group using groupcast or UEs of a service using broadcast during the TxEn duration 1002, and TxEn2, TxEn3, TxEn4, and TxEn5 may pull data from UEs of a pair, a group or a service during the TxEn duration 1004, as illustrated.

In some aspects, the TxEn indications may be transmitted at different resource locations at last few symbols of a slot, e.g., TxEn2, TxEn3, TxEn4 and TxEn5 as illustrated in FIG. 10. The sequence may contain at least the Rx UE ID (e.g., Rx UE's ID or source ID) within the initial value or cyclic shift value and the transmitting locations (e.g., resource allocations) may be mapped with the Tx UE IDs or destination ID of a UE pair, a group or a service (so that the Tx UEs may monitor the TxEn at the corresponding locations).

Different sequence based TxEN indications may be code-division multiplexed (CDMed) (e.g., TxEn1) with different initial sequences or different cyclic shifts for different Tx UEs. The Tx UE(s) blindly detects each TxEn indication with different initial sequences or cyclic shifts associated with different Tx UEs. In some cases, the TxEN indications may be frequency-division multiplexed (e.g., TxEn2 and TxEn3, TxEn4 and TxEn5) or time-division multiplexed (TDMed) (e.g., TxEn2 and TxEn4, TxEn3 and TxEn5) or may be transmitted using a combination of FDM, TDM, and CDM. The Tx UE(s) detects each TxEn indication at a different resource allocation, respectively. The Tx UE blindly detects each TxEn indication at different resource allocation respectively if combined using CDM.

Figure 11:
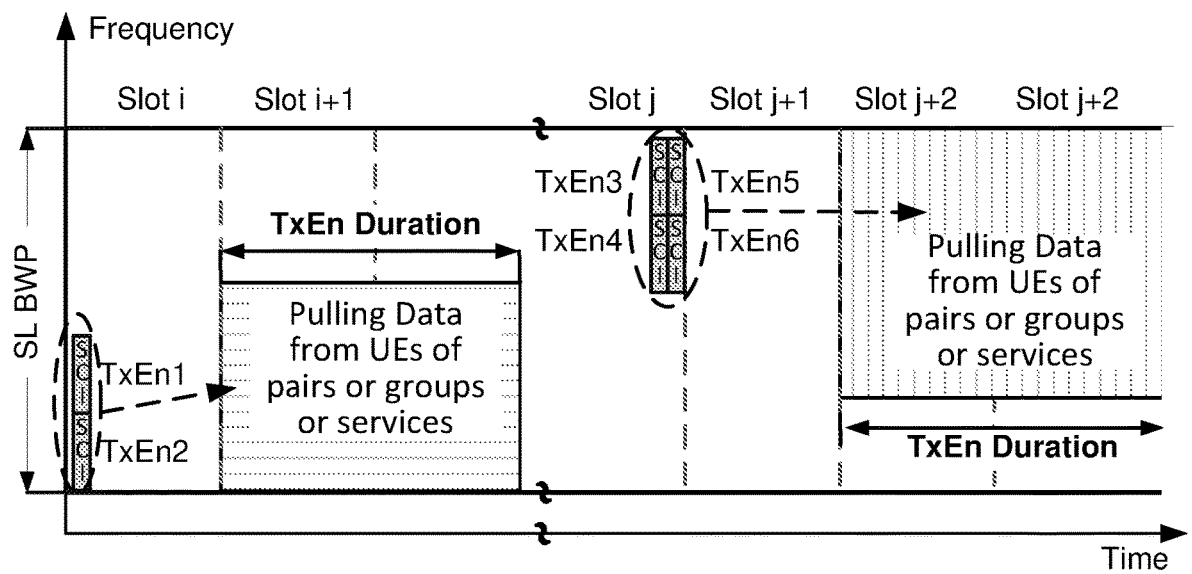
FIG. 11 illustrates transmission of TxEn indications using a sidelink control information (SCI)-based approach, in accordance with certain aspects of the present disclosure.

FIG. 11 illustrates transmission of TxEn indications using an SCI-based design, in accordance with certain aspects of the present disclosure. As illustrated, a Rx UE may send different TxEn indications to Tx UEs using SCI. For a Rx UE sending TxEn indications to different Tx UEs, the TxEn indications may be SCI based signaling at physical layer and transmitted at the beginning (e.g., TxEn1 and TxEn2) or ending (e.g., TxEn3, TxEn4, TxEn5, TxEn6) symbols of a slot, as illustrated. The TxEn indication may contain the various SCI fields, either within one stage of an SCI or across two stages of the SCI. The various SCI fields may include: both Rx UE ID and Tx UE ID (e.g., Rx UE's ID or source ID, Tx UE's ID or destination ID, etc.); TxEn duration, e.g., time interval for transmission enabling window or number (e.g., quantity) of SL DRX cycles; Rx UE's location and communication range (e.g. a range within which the TxEn indication is applicable); selected resources for transmissions or blocked resources for transmissions (assistance from Rx UE); sidelink carrier indication and/or sidelink band width part (SL BWP) indication; measurements such as CBR, RSRP, RSSI, or SINR from Rx UE; or any combination thereof. All Tx UEs may monitor the TxEn indication(s) at the monitoring occasions per the TxEn configuration and decide to wake up for transmitting data or not based on whether the Tx UE's ID is indicated, whether any data is available in the buffer during the time interval (e.g., TxEn duration), and whether the Tx UE is within the communication range (e.g., as indicated via the SCI field from the Rx UE and determined based on the Rx UE's location). Different SCI based TxEN indications may be FDMed (e.g., TxEn1 and TxEn2, TxEn3 and TxEn5) or TDMed (e.g., TxEn3 and TxEn5, TxEn4 and TxEn6) or combined with both FDM and TDM. The Tx UE(s) detects each TxEn indication at different resource allocation respectively.

Figure 12:
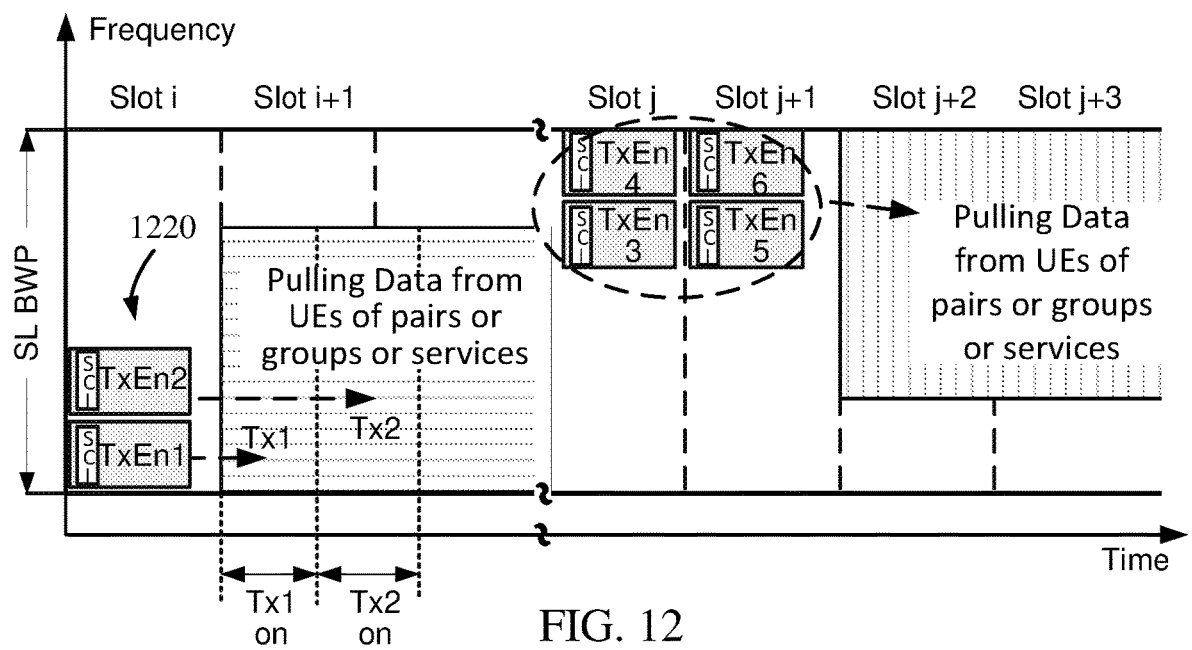
FIG. 12 illustrates transmission of TxEn indications using a medium access control (MAC) control element (CE)-based approach, in accordance with certain aspects of the present disclosure.

FIG. 12 illustrates transmission of TxEn indications using a medium access control (MAC) control element (CE) based design, in accordance with certain aspects of the present disclosure. A Rx UE may send different TxEn indications to Tx UEs using a MAC CE. For instance, TxEn2 may be sent to a Tx UE using MAC CE 1220 on a sidelink data channel having an SCI, as illustrated. For a Rx UE sending TxEn indications to different Tx UEs, the TxEn indications may be MAC CE based at a MAC layer and transmitted at the slot prior to a TxEn duration, as illustrated. The TxEn indication may contain, within either a one stage SCI or across two stages of the SCI, the following information: both Rx UE ID and Tx UE ID (e.g., Rx UE's ID or source ID, Tx UE's ID or destination ID, etc.); Rx UE's location and communication range; selected resources for transmissions or blocked resources for transmissions; sidelink carrier indication and/ or sidelink band width part (SL BWP) indication; or any combination thereof.

The TxEn indication may contain more information with different MAC CEs or MAC CE fields, e.g., the active TxEn interval for each Tx UE during which the Tx UE is to transmit data (e.g., Tx1 on phase for a first Tx UE, and Tx2 phase for a second Tx UE), resources selected or blocked, and/or channel quality measurements (CBR, RSRP, RSSI, or SINR). All Tx UEs may monitor the TxEn indication(s) at the monitoring occasions per the TxEn configuration and decide to wake up for transmitting data or not based on whether the Tx UE's ID is indicated, whether any data is available in the buffer during Tx UE's TxEn duration, whether the Tx UE is within the communication range, and whether the resource indicated can be used or not. Different MAC CE based TxEn indications may be FDMed (e.g., TxEn1 and TxEn2, TxEn3 and TxEn4) or TDMed (e.g., TxEn3 and TxEn5, TxEn4 and TxEn6) or combined using both FDM and TDM. The Tx UE(s) detects each TxEn at different resource allocation respectively.

Figure 13:
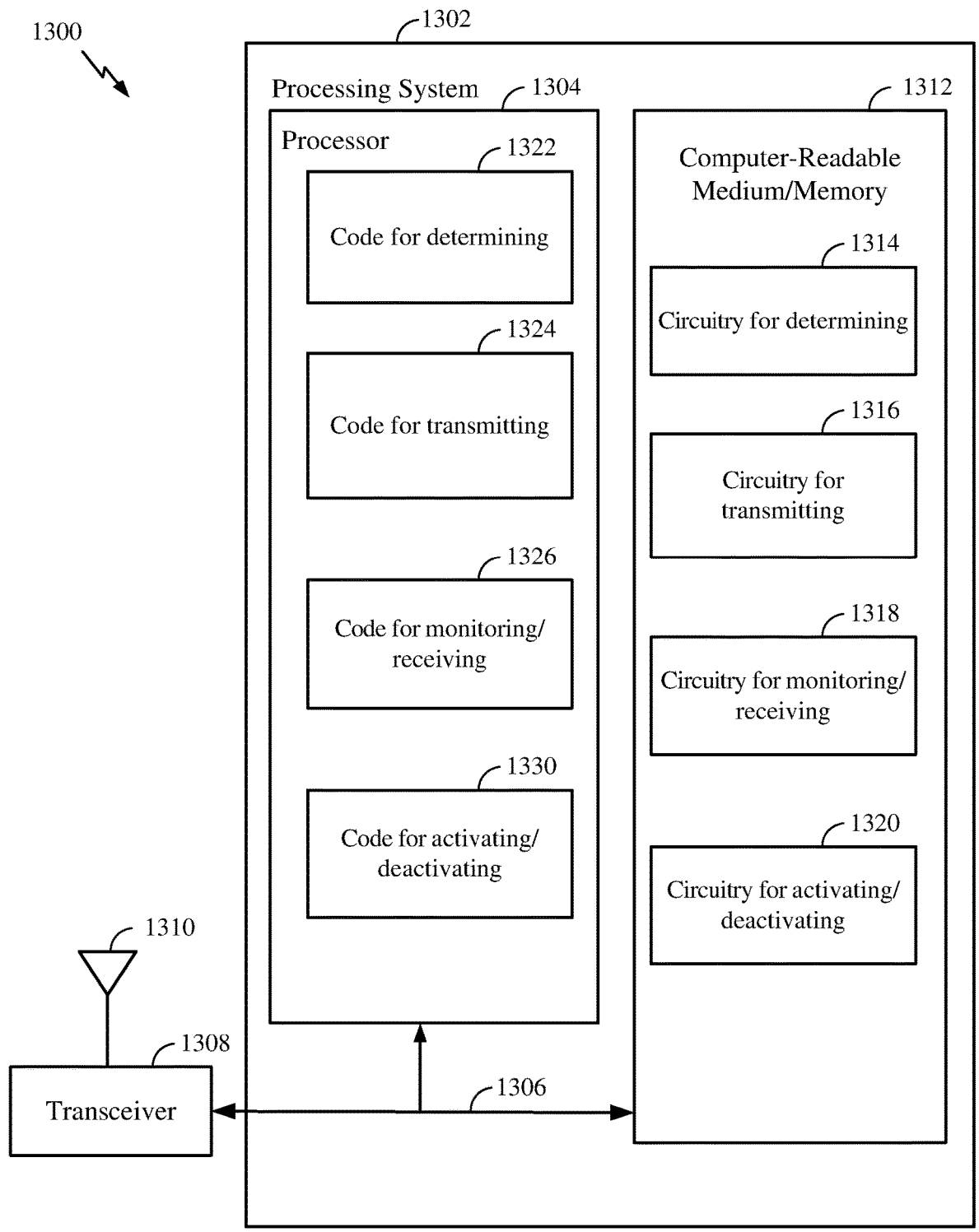
FIG. 13 illustrates a communications device that may include various components configured to perform operations for the techniques disclosed herein.

FIG. 13 illustrates a communications device 1300 that may include various components (e.g., corresponding to means-plus-function components) configured to perform operations for the techniques disclosed herein, such as the operations illustrated in FIGS. 5 and 6. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/ memory 1312 is configured to store instructions (e.g., computer-executable code) that when executed by the processor 1304, cause the processor 1304 to perform the operations illustrated in FIGS. 5 and 6. In certain aspects, computer-readable medium/memory 1312 stores code 1314 for determining; code 1316 for transmitting; code 1318 for monitoring/receiving/and code 1320 for activating/deactivating. In certain aspects, the processor 1304 has circuitry configured to implement the code stored in the computer-readable medium/memory 1312. The processor 1304 includes circuitry 1322 for determining; code 1324 for transmitting; code 1326 for monitoring/receiving and code 1330 for activating/deactivating.

Example Aspects

Aspect 1. A method for wireless communication by a first user-equipment (UE), comprising: determining whether data is to be received from one or more second UEs for at least one application or service with at least one sidelink communications; transmitting at least one enable signal indicating to the one or more second UEs to transition to an active mode of operation to transmit the data; and monitoring for the data in response to the at least one enable signal during a reception phase of the UE for the at least one application or service with the at least one sidelink communications.

Aspect 2. The method of aspect 1, wherein the indication to transition to the active mode of operation comprises an indication to activate a transmit chain for the transmission of the data from the one or more second UEs.

Aspect 3. The method of any one of aspects 1-2, further comprising activating a receive chain to monitor for the data during the reception phase of the first UE.

Aspect 4. The method of any one of aspects 1-3, further comprising receiving the data from the one or more second UEs during the reception phase of the first UE.

Aspect 5. The method of any one of aspects 1-4, further comprising: receiving, during the reception phase, an indication that no data is to be transmitted by the one or more second UEs; and deactivating a receive chain of the UE in response to the indication to end the reception phase.

Aspect 6. The method of aspect 5, further comprising transmitting at least one disable signal to the one or more second UEs, the at least one disable signal indicating that the one or more second UEs can transition to an inactive state of operation.

Aspect 7. The method of any one of aspects 1-6, further comprising receiving a wake up signal from a third UE, wherein the transmission of the at least one enable signal is in response to the wake up signal.

Aspect 8. The method of aspect 7, wherein the third UE is one of the one or more second UEs.

Aspect 9. The method of any one of aspects 1-8, wherein the transmission of the at least one enable signal is in response to a trigger from a higher layer of the UE.

Aspect 10. The method of aspect 9, wherein the higher layer comprises an application layer of the UE.

Aspect 11. The method of any one of aspects 1-10, wherein the at least one enable signal is transmitted during a sidelink discontinuous reception (DRX) on phase.

Aspect 12. The method of aspect 11, further comprising receiving control information along with the data, the control information allocating resources for another transmission after the sidelink DRX on phase, the method further comprising extending the sidelink DRX on phase to monitor for the other transmission.

Aspect 13. The method of aspect 12, wherein the other transmission comprises a retransmission of the data.

Aspect 14. The method of any one of aspects 1-13, wherein the one or more second UEs comprise multiple UEs, wherein transmitting the at least one enable signal comprises: transmitting a first enable signal to one of the multiple UEs during a first DRX on phase; and transmitting a second enable signal to another one of the multiple UEs during a second DRX on phase.

Aspect 15. The method of any one of aspects 1-14, wherein the one or more second UEs comprise multiple UEs, and wherein transmitting the at least one enable signal comprises transmitting an enable signal to each of the multiple UEs during a sidelink DRX on phase.

Aspect 16. The method of any one of aspects 1-15, wherein the one or more second UEs comprises a first set of UEs associated with a group or service and a second set of UEs associated with another group or another service, and wherein transmitting the at least one enable signal comprises: transmitting at least one first enable signal to the first set of UEs during a first sidelink DRX on phase; and transmitting at least one second enable signal to the second set of UEs during a second sidelink DRX on phase.

Aspect 17. The method of any one of aspects 1-16, wherein the one or more second UEs comprises a first set of UEs associated with a group or service and a second set of UEs associated with another group or another service, and wherein the at least one enable signal is transmitted to the first set of UEs and the second set of UEs during a sidelink DRX on phase.

Aspect 18. The method of any one of aspects 1-17, wherein transmitting the at least one enable signal comprises transmitting multiple enable signals, the multiple enable signals being at least one of code division multiplexed, frequency division multiplexed, or time division multiplexed.

Aspect 19. The method of any one of aspects 1-18, wherein each of the at least one enable signal comprises a sequence associated with a service, UE group, or UE pair.

Aspect 20. The method of any one of aspects 1-19, wherein the at least one enable signal is included in at least one sidelink control information (SCI) or a medium access control (MAC) control element (CE).

Aspect 21. The method of any one of aspects 1-20, wherein each of the at least one enable signal indicates at least one of: an identifier of the first UE; an identifier of a respective one of the one or more second UEs; a duration of a transmission enable window during which the data is to be transmitted; a quantity of sidelink DRX cycles to be used for transmission of the data; a location of the first UE; a resource for transmission of the data; a resource blocked for transmission of the data; an indication of a sidelink carrier for transmission of the data; an indication of sidelink band width part (SL BWP) for transmission of the data; or channel quality measurements.

Aspect 22. A method for wireless communication by a first user-equipment (UE), comprising: receiving, from a second UE, an enable signal indicating to the first UE to transition to an active mode of operation to transmit data for at least one application or service with at least one sidelink communications; determining whether data is to be transmitted to the second UE during a transmit phase based on the enable signal; and transmitting the data to the second UE during the transmit phase based on the determination for the at least one application or service with the at least one sidelink communication.

Aspect 23. The method of aspect 22, wherein the indication to transition to the active mode of operation comprises an indication to activate a transmit chain for the transmission of the data.

Aspect 24. The method of any one of aspects 22-23, further comprising activating a transmit chain to transmit the data during the transmit phase of the first UE based on the determination.

Aspect 25. The method of any one of aspects 22-24, further comprising transmitting the data to the second UE during the transmit phase based on the determination.

Aspect 26. The method of any one of aspects 22-25, further comprising transmitting, during the transmit phase, an indication that no data is to be transmitted based on the determination.

Aspect 27. The method of aspect 26, further comprising receiving at least one disable signal from the second UE, the at least one disable signal indicating that the first UE can transition to an inactive state of operation.

Aspect 28. The method of any one of aspects 22-27, wherein the enable signal is transmitted during a sidelink discontinuous reception (DRX) on phase.

Aspect 29. The method of aspect 28, further comprising transmitting control information along with the data, the control information allocating resources for another transmission after the sidelink DRX on phase, the method further comprising extending the sidelink DRX on phase to transmit the other transmission.

Aspect 30. The method of aspect 29, wherein the other transmission comprises a retransmission of the data.

Aspect 31. The method of any one of aspects 22-30, wherein the enable signal is at least one of code division multiplexed, frequency division multiplexed, or time division multiplexed with one or more other enable signals.

Aspect 32. The method of any one of aspects 22-31, wherein the enable signal comprises a sequence associated with a service, UE group, or UE pair.

Aspect 33. The method of any one of aspects 22-32, wherein the enable signal is included in at least one sidelink control information (SCI) or a medium access control (MAC) control element (CE).

Aspect 34. The method of any one of aspects 22-33, wherein the enable signal indicates at least one of: an identifier of the second UE; an identifier of the first UE; a duration of a transmission enable window during which the data is to be transmitted; a quantity of sidelink DRX cycles to be used for transmission of the data; a location of the UE; a resource for transmission of the data; a resource blocked for transmission of the data; an indication of a sidelink carrier for transmission of the data; an indication of sidelink band width part (SL BWP) for transmission of the data; or channel quality measurements.

Aspect 35. The method of any one of aspects 22-34, further comprising determining whether the first UE is within a communication range with the second UE based on a location of the second UE, the method further comprising ignoring the enable signal if the first UE is not within the communication range.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a first user-equipment (UE), comprising:
    determining whether data is to be received from one or more second UEs for at least one application or service with at least one sidelink communication;
    transmitting, during a sidelink discontinuous reception (DRX) on phase, at least one enable signal indicating to the one or more second UEs to transition to an active mode of operation to transmit the data; and
    monitoring for the data in response to the at least one enable signal during a reception phase of the first UE for the at least one application or service with the at least one sidelink communication.

2. The method of claim 1, wherein the indication to transition to the active mode of operation comprises an indication to activate a transmit chain for the transmission of the data from the one or more second UEs.

3. The method of claim 1, further comprising:
    activating a receive chain to monitor for the data during the reception phase of the first UE; and
    receiving the data from the one or more second UEs during the reception phase of the first UE.

4. The method of claim 1, further comprising:
    receiving, during the reception phase, an indication that no data is to be transmitted by the one or more second UEs; and
    deactivating a receive chain of the first UE in response to the indication to end the reception phase.

5. The method of claim 4, further comprising transmitting at least one disable signal to the one or more second UEs, the at least one disable signal indicating that the one or more second UEs can transition to an inactive state of operation.

6. The method of claim 1, further comprising receiving a wake up signal from a third UE, wherein the transmission of the at least one enable signal is in response to the wake up signal, wherein the third UE is one of the one or more second UEs.

7. The method of claim 1, wherein the transmission of the at least one enable signal is in response to a trigger from a higher layer of the first UE, wherein the higher layer comprises an application layer of the first UE.

8. The method of claim 1, wherein the one or more second UEs comprise multiple UEs, wherein transmitting the at least one enable signal during the sidelink DRX on phase comprises:

transmitting a first enable signal to one of the multiple UEs during a first DRX on phase; and
transmitting a second enable signal to another one of the multiple UEs during a second DRX on phase.

9. The method of claim 1, further comprising:
receiving control information along with the data, the control information allocating resources for another transmission from one of the one or more second UEs after the sidelink DRX on phase; and
extending the sidelink DRX on phase to monitor for the other transmission from the one of the one or more second UEs, wherein the other transmission comprises a retransmission of the data.

10. The method of claim 1, wherein the one or more second UEs comprises a first set of UEs associated with a group or service and a second set of UEs associated with another group or another service, and wherein transmitting the at least one enable signal comprises:
transmitting at least one first enable signal to the first set of UEs during a first sidelink DRX on phase; and
transmitting at least one second enable signal to the second set of UEs during a second sidelink DRX on phase.

11. The method of claim 1, wherein transmitting the at least one enable signal comprises transmitting multiple enable signals, the multiple enable signals being at least one of code division multiplexed, frequency division multiplexed, or time division multiplexed.

12. The method of claim 1, wherein each of the at least one enable signal comprises a sequence associated with a service, UE group, or UE pair.

13. The method of claim 1, wherein the at least one enable signal is included in at least one sidelink control information (SCI) or a medium access control (MAC) control element (CE).

14. The method of claim 1, wherein each of the at least one enable signal indicates at least one of:
an identifier of the first UE;
an identifier of a respective one of the one or more second UEs;
a duration of a transmission enable window during which the data is to be transmitted;
a quantity of sidelink DRX cycles to be used for transmission of the data;
a location of the first UE;
a resource for transmission of the data;
a resource blocked for transmission of the data;
an indication of a sidelink carrier for transmission of the data;
an indication of sidelink band width part (SL BWP) for transmission of the data; or
channel quality measurements.

15. A method for wireless communication by a first user-equipment (UE), comprising:
receiving, from a second UE, an enable signal indicating to the first UE to transition to an active mode of operation to transmit data for at least one application or service with at least one sidelink communication, wherein the enable signal is transmitted during a sidelink discontinuous reception (DRX) on phase;
determining whether data is to be transmitted to the second UE during a transmit phase based on the enable signal; and
transmitting the data to the second UE during the transmit phase based on the determination for the at least one application or service with the at least one sidelink communication.

16. The method of claim 15, wherein the indication to transition to the active mode of operation comprises an indication to activate a transmit chain to transmit the data during the transmit phase of the first UE based on the determination.

17. The method of claim 15, further comprising:
transmitting, during the transmit phase, an indication that no data is to be transmitted based on the determination; and
receiving at least one disable signal from the second UE, the at least one disable signal indicating that the first UE can transition to an inactive state of operation.

18. The method of claim 15, further comprising:
transmitting control information along with the data, the control information allocating resources for another transmission after the sidelink DRX on phase; and
extending the sidelink DRX on phase to transmit the other transmission, wherein the other transmission comprises a retransmission of the data.

19. The method of claim 15, further comprising:
determining whether the first UE is within a communication range with the second UE based on a location of the second UE; and
ignoring the enable signal if the first UE is not within the communication range.

20. A first user-equipment (UE) configured for wireless communications, comprising:
memory comprising computer-executable instructions; and
one or more processors configured, individually or collectively, to execute the computer-executable instructions and cause the first UE to:
determine whether data is to be received from one or more second UEs for at least one application or service with at least one sidelink communication;
transmit, during a sidelink discontinuous reception (DRX) on phase, at least one enable signal indicating to the one or more second UEs to transition to an active mode of operation to transmit the data; and
monitor for the data in response to the at least one enable signal during a reception phase of the first UE for the at least one application or service with the at least one sidelink communication.

21. The first UE of claim 20, wherein the indication to transition to the active mode of operation comprises an indication to activate a transmit chain for the transmission of the data from the one or more second UEs.

22. The first UE of claim 20, wherein the one or more processors are configured, individually or collectively, to execute the computer-executable instructions and further cause the first UE to:
activate a receive chain to monitor for the data during the reception phase of the first UE; and
receive the data from the one or more second UEs during the reception phase of the first UE.

23. The first UE of claim 20, wherein the one or more processors are configured, individually or collectively, to execute the computer-executable instructions and further cause the first UE to:
receive, during the reception phase, an indication that no data is to be transmitted by the one or more second UEs;
deactivate a receive chain of the first UE in response to the indication to end the reception phase; and transmit at least one disable signal to the one or more second UEs, the at least one disable signal indicating that the one or more second UEs can transition to an inactive state of operation.

24. The first UE of claim 20, wherein the one or more processors are configured, individually or collectively, to execute the computer-executable instructions and further cause the first UE to receive a wake up signal from a third UE, wherein the transmission of the at least one enable signal is in response to the wake up signal, wherein the third UE is one of the one or more second UEs.

25. The first UE of claim 20, wherein the one or more processors are configured, individually or collectively, to execute the computer-executable instructions and further cause the first UE to transmit the at least one enable signal in response to a trigger from a higher layer of the first UE, wherein the higher layer comprises an application layer of the first UE.

26. The first UE of claim 1, wherein the one or more second UEs comprise multiple UEs, wherein the one or more processors are configured, individually or collectively, to execute the computer-executable instructions and cause the first UE to transmit the at least one enable signal during the sidelink DRX on phase comprises the one or more processors being configured, individually or collectively, to execute the computer-executable instructions and cause the first UE to:
    transmit a first enable signal to one of the multiple UEs during a first DRX on phase; and
    transmit a second enable signal to another one of the multiple UEs during a second DRX on phase.

27. The first UE of claim 26, wherein the one or more processors are configured, individually or collectively, to execute the computer-executable instructions and further cause the first UE to:
    receive control information along with the data, the control information allocating resources for another transmission from one of the one or more second UEs after the sidelink DRX on phase; and
    extend the sidelink DRX on phase to monitor for the other transmission from the one of the one or more second UEs, wherein the other transmission comprises a retransmission of the data.

28. The first UE of claim 20, wherein the one or more second UEs comprises a first set of UEs associated with a group or service and a second set of UEs associated with another group or another service, and wherein the one or more processors are configured, individually or collectively, to execute the computer-executable instructions and to cause the first UE to transmit the at least one enable signal comprises the one or more processors being configured, individually or collectively, to execute the computer-executable instructions and cause the first UE to:
    transmit at least one first enable signal to the first set of UEs during a first sidelink DRX on phase; and
    transmit at least one second enable signal to the second set of UEs during a second sidelink DRX on phase.

29. The first UE of claim 20, wherein the one or more processors are configured, individually or collectively, to execute the computer-executable instructions and cause the first UE to transmit the at least one enable signal comprises the one or more processors being configured, individually or collectively, to execute the computer-executable instructions and cause the first UE to transmit multiple enable signals, the multiple enable signals being at least one of code division multiplexed, frequency division multiplexed, or time division multiplexed.

30. A first user-equipment (UE) configured for wireless communications, comprising:
    memory comprising computer-executable instructions; and
    one or more processors configured, individually or collectively, to execute the computer-executable instructions and cause the first UE to:
        receive, from a second UE, an enable signal indicating to the first UE to transition to an active mode of operation to transmit data for at least one application or service with at least one sidelink communications, wherein the enable signal is transmitted during a sidelink discontinuous reception (DRX) on phase;
        determine whether data is to be transmitted to the second UE during a transmit phase based on the enable signal; and
        transmit the data to the second UE during the transmit phase based on the determination for the at least one application or service with the at least one sidelink communication.

* * * * *